A. L. WILLIAMS.
TROLLEY HEAD.
APPLICATION FILED MAY 15, 1914.
1,130,361.
Patented Mar. 2, 1915.
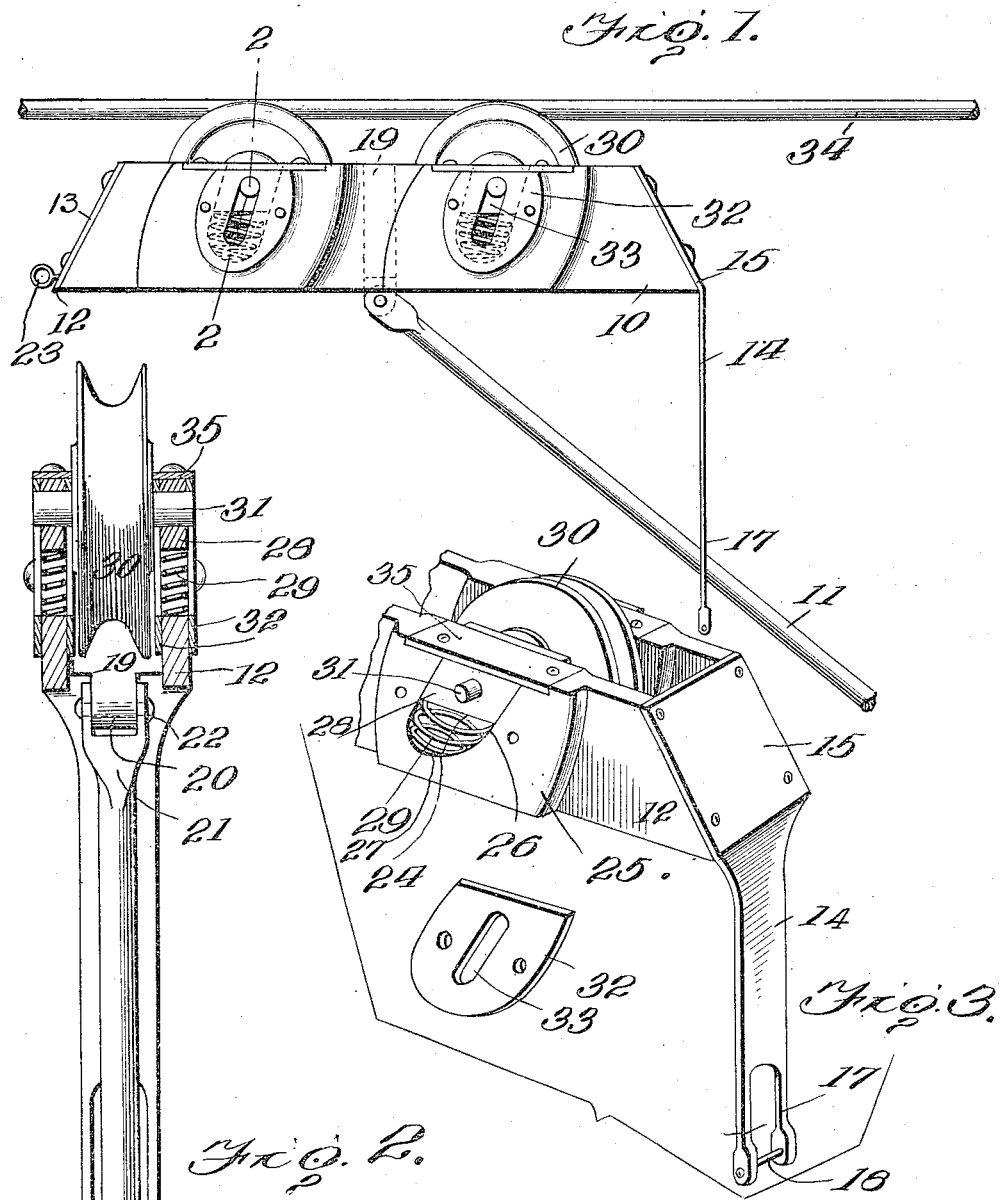

UNITED STATES PATENT OFFICE.

ALFONZO L. WILLIAMS, OF LOS ANGELES, CALIFORNIA.

TROLLEY-HEAD.

1,130,361.      Specification of Letters Patent.      Patented Mar. 2, 1915.

Application filed May 15, 1914. Serial No. 838,791.

*To all whom it may concern:*

Be it known that I, ALFONZO L. WILLIAMS, citizen of the United States, residing at Los Angeles, in the county of Los Angeles and State of California, have invented certain new and useful Improvements in Trolley-Heads, of which the following is a specification.

This invention relates to trolley heads wherein a plurality of trolley wheels are employed and has for its primary object to provide an improved device of this character wherein the head may be so supported upon the trolley pole and the trolley wheels may be so supported by the head that said wheels may be caused to follow any unevennesses in the trolley wire and will not become displaced therefrom upon rounding curves or upon coming in contact with switches or breaks.

The invention has as a further object to provide a trolley head wherein the trolley wheels will be resiliently supported and thus cushioned to absorb any shock upon said wheels due to coming in contact with switches or other similar obstructions upon the trolley wire. And the invention has as a still further object to provide a trolley head wherein the trolley wheels are mounted in bearing blocks which may be readily removed from the frame of the head together with the trolley wheels to permit of easy repair.

With these and other objects in view my invention will be more fully described, illustrated in the accompanying drawings and then specifically pointed out in the claims which are attached to and form a part of this application.

In the accompanying drawings: Figure 1 is an elevation showing my improved trolley head in operative position upon a trolley pole, the pole being broken away. Fig. 2 is a vertical sectional view taken on the line 2—2 of Fig. 1, and showing the mounting of the adjacent trolley wheel, and Fig. 3 is a fragmentary perspective view more particularly showing the disposition of one of the bearing blocks and the plates employed for maintaining said blocks in position within the frame.

Corresponding and like parts are referred to in the following description and indicated in all the views of the drawings by the same reference characters.

To clearly bring out the manner in which my improved trolley head is mounted upon a trolley pole I have shown in Fig. 1 of the drawings, the head designated 10 as a whole, arranged upon the free extremity of the trolley pole 11. The head 10 includes the side members 12 which are arranged in spaced parallel relation and are each connected at one extremity by a rear end plate 13 which is bolted or otherwise secured to the side members 12, and arranged upon the forward end of the head is a guard 14. Said guard is formed with a head 15 which is bolted or otherwise secured to the adjacent extremities of the side members 12 and connects said members. Extending from the head 15 of the guard is a shank 16 at the free extremity of which is provided a yoke including spaced arms 17, which are connected adjacent their outer extremities by a pin 18.

Extending between the side members 12 and preferably arranged midway the ends thereof is a block 19. Said block is designed to pivotally support the head 10 upon the pole 11 and may be connected therewith in any suitable manner. However, in the drawings I have shown said block as being formed with an extension 20 which is embraced by a yoke 21 formed upon the trolley pole, a bolt 22 being passed through the arms of said yoke and through the extension 20 of the block. It will thus be seen that the head 10 is mounted for free pivotal movement upon the trolley pole and as shown in Figs. 1 and 2 of the drawings, the guard 14 is arranged to connect the forward end of the head with the trolley pole, the trolley pole being passed through the yoke formed on the free extremity of the guard. The guard thus limits the head 10 in its pivotal movement to a certain degree and under ordinary circumstances will maintain the head in a relatively operative or horizontal position. However, it is to be observed that the guard 14 will not hamper the pivotal movement of the head to an extent such as would prevent the trolley wheels arranged upon the head, which wheels will be presently described, from following any unevennesses or depressions, or obstructions in the trolley wire. When the head 10 is thus moved pivotally upon the pole 11, due to the contact of the trolley wheels with any obstructions or depressions in the trolley wire, the yoke of the guard will slide upon the trolley pole to thus permit the head 10 to move a sufficient degree to maintain the trolley wheels in contact with the wire. Secured to the plate 13 is a suitable eye 23 to which may be connected a trolley rope or cable. Any suitable form of cable may be employed and since said cable forms no part of my invention it has not been illustrated. However, it is to be understood that when it is desired to move the trolley pole 11 by said cable, pull upon the cable tending to move the head 10 pivotally, will be supported by the guard 14. Attention is called to the fact that the guard 14 is also so arranged that in the event the trolley wheels carried by the head 10 leave the trolley wire, cross arms or wires supporting the trolley wire will be prevented by said guard from becoming engaged beneath the forward extremity of the head 10. The guard 14 is therefore, an important part of my invention and while I have shown said guard as being formed with a yoke arranged to engage the trolley pole, still, it is to be understood that said guard may be operatively connected with said pole in any suitable manner.

Formed in the side members 12 upon each side of the block 19 are pairs of oppositely disposed slots or recesses 24, and it will be observed that the side members 12 are laterally enlarged adjacent said recesses as shown at 25 to form journaled bearings. The side walls 26 of each of the recesses 24 are preferably inclined forwardly and obliquely with reference to the horizontal axis of the head 10, while the bottom wall 27 of each of said recesses 24 is preferably curved, as shown.

Mounted in the recesses 24 are bearing blocks 28 which are each formed with obliquely arranged end walls adapted to contact with the obliquely disposed walls of said recesses. The bearing blocks 28 are slidably mounted within the recesses 24 and interposed between said blocks and the curved bottom walls 27 of the recesses are springs 29. Journaled within the bearing blocks 28 are trolley wheels 30, one of said wheels being arranged upon each side of the block 19 and it will be observed that the trunnions 31 of each of said wheels project beyond the exterior faces of said blocks. Secured to the adjacent side faces of each of the members 12 are plates 32, one of said plates being shown in detail in Fig. 3 of the drawings. It will be observed that one of said plates 32 is arranged upon each side of each of the recesses 24 and form closures for said recesses, each of said plates being longitudinally slotted as at 33 to receive the adjacent trunnion of the adjacent trolley wheel, said trunnions being arranged to project exteriorly of the bearing blocks 28 to engage within the slots of the plates arranged upon the outer faces of the members 12. The trolley wheels 30 are thus resiliently supported upon the side members 12 by the springs 29, said springs being arranged to absorb any shock incident to the trolley wheels coming in contact with obstructions or other unequalities in the level of the trolley wire, the trolley wire being conventionally shown at 34 in Fig. 1 of the drawings. Furthermore, in thus mounting the trolley wheels as shown, a certain amount of lateral play of said wheels is permitted so that when the head is rounding a curve in the trolley wire, said wheels will move laterally, with respect to the vertical plane thereof, against the tension of the springs 29, to thus more effectually maintain the wheels in engagement with the wire. The trolley wheels 30 are arranged in alinement and are spaced apart so that in the event the forward wheel is caused to leave the wire through coming in contact with any obstruction, the head 10 being thus moved pivotally upon the pole 11, the rearwardly disposed trolley wheel will maintain its engagement with the wire for a sufficient length of time to direct the forwardly disposed trolley wheel back into engagement with said wire before the rearwardly disposed trolley wheel comes in contact with the obstruction causing the disengagement of the forward trolley wheel.

Secured to the upper edges of the side members 12 and extending over each of the recesses 24 are strips 35 which are so arranged as to maintain the bearing blocks 28 in position within the recesses 24. The strips 35 as well as the plates 32 are each detachably connected with the side members, being preferably secured in position by screws, so that in the event any of the parts become broken, said plates may be readily moved so that the removal of said parts may be easily effected. By this construction, the trolley wheels 30 may also be readily removed from the head 10. It will therefore be seen that I provide a very simple and efficient construction for the purpose set forth wherein the trolley wheels are cushioned against any shock due to coming in contact with any obstructions upon the trolley wire and wherein the trolley wheels are so supported and arranged as to effectually maintain their engagement with said wire. It will also be seen that the trolley wheels and the parts connected thereto may be readily removed from the head to permit of repair.

Having thus described my invention what I claim and desire to secure by Letters Patent is:

1. The combination with a trolley pole, of a head pivotally connected thereto and including supporting members, a trolley wheel slidably mounted upon said members, resilient cushioning means for said wheel, and means connecting one extremity of the head with the trolley pole, said means having slidable connection with the pole.

2. The combination with a trolley pole, of a head pivotally connected thereto and including supporting members, a trolley wheel slidably mounted upon said members and operatively connected therewith, and means carried by one extremity of the head and arranged to engage the trolley pole.

3. A trolley head adapted for pivotal connection with a trolley pole and including supporting members, a resiliently supported trolley wheel operatively connected with said members and slidable thereon, and means carried by the head and disposed to slidably engage the trolley pole, said means being arranged to form a guard for the head.

4. A trolley head adapted for pivotal connection with a trolley pole and including supporting members, a plurality of trolley wheels detachably mounted upon said members and slidably connected therewith, resilient cushioning means for said wheels, and means carried by one extremity of the head and arranged to slidably engage the trolley pole.

5. A trolley head adapted for detachable connection with a trolley pole, said head including spaced supporting members having oppositely disposed recesses formed therein, the walls of said recesses being inclined obliquely with reference to the longitudinal axis of said members, bearing blocks mounted in said recesses, a trolley wheel mounted for rotation in said bearing blocks, means detachably connected with said supporting members and arranged to maintain said bearing blocks in operative position within said recesses, and means carried by one extremity of the head and disposed to slidably engage the trolley pole.

6. A trolley head adapted for pivotal connection with a trolley pole, said head including spaced supporting members having oppositely disposed recesses formed therein opening through the upper edges of said members, bearing blocks mounted in said recesses, a trolley wheel mounted for rotation upon said bearing blocks, springs disposed in said recesses and arranged to engage the bearing blocks, strips secured to the upper edges of the supporting members and arranged to extend across said recesses to maintain the bearing blocks in operative position therein, and means connected with one extremity of the head and disposed to slidably engage the trolley pole.

7. A trolley head adapted for pivotal connection with a trolley pole and including spaced supporting members having oppositely disposed recesses formed therein, bearing blocks mounted in said recesses, a trolley wheel mounted for rotation upon said bearing blocks, springs disposed in said recesses and arranged to engage said bearing blocks, plates secured to the side faces of each of said supporting members and arranged to maintain the bearing blocks in operative position within said recesses, and means connected with one extremity of the head and arranged to slidably engage the trolley pole.

8. A trolley head adapted for pivotal connection with a trolley pole and including spaced supporting members having oppositely disposed recesses formed therein, bearing blocks slidably mounted in said recesses, springs disposed in said recesses and arranged to engage said bearing blocks, a trolley wheel having trunnions formed thereon, said trunnions being mounted for rotation upon said bearing blocks and arranged to extend exteriorly thereof, plates secured to the side faces of the supporting members and providing a housing for said recesses, said plates having slots formed therein, the free extremities of said trunnions being disposed in said slots, and means connected with one extremity of the head and disposed to slidably engage the trolley pole.

9. A trolley head adapted for pivotal connection with a trolley pole and including spaced supporting members having recesses formed therein, bearing blocks mounted in said recesses, a trolley wheel having a shaft extending through said bearing blocks and mounted for rotation therein, plates secured to the side faces of the supporting members and providing a housing for said recesses, said plates having slots formed therein arranged to receive the extremities of the shaft of the trolley wheel, and means connected with one extremity of the head and disposed to slidably engage the trolley pole.

10. A trolley head adapted for pivotal connection with a trolley pole and including side members having recesses formed therein opening through the upper edges of said members, bearing blocks slidably mounted in said recesses, springs disposed in said recesses and arranged to engage said bearing blocks, plates detachably secured to the side faces of each of said members and arranged to form a housing for said recesses, strips detachably secured to the upper edges of said side members and disposed to extend across said recesses, said strips being adapted to maintain the bearing blocks in operative position within said recesses, a trolley wheel mounted for rotation upon said bearing blocks, and means connected with one extremity of the head and disposed to slidably engage the trolley pole.

11. A trolley head adapted for pivotal connection with a trolley pole, a trolley wheel mounted for rotation upon said head, and means connected with one extremity of the head and adapted to slidably engage the trolley pole, said means being arranged to form a guard for the head.

12. A trolley head adapted for pivotal connection with a trolley pole, a trolley wheel mounted for rotation upon the head, and a guard carried by the head, said guard being formed with a yoke adapted to slidably engage the trolley pole and arranged to limit the head in its pivotal movement upon the pole.

13. The combination with a trolley pole, of a trolley head pivotally connected thereto, said head including spaced supporting members, a block extending between said members and pivotally connected with the trolley pole, trolley wheels mounted for rotation between said members and supported thereby, one of said wheels being arranged upon each side of said block, and means connected with the head and disposed to slidably engage the trolley pole, said means being adapted to limit the head in its pivotal movement upon the pole.

14. A trolley head adapted for pivotal connection with a trolley pole and including supporting members, a trolley wheel mounted for vertical movement and for lateral movement, with respect to a vertical plane, upon said members, and means carried by the head and disposed to slidably engage the trolley pole.

15. A trolley head adapted for pivotal connection with a trolley pole and including supporting members, resilient means carried by said members, a trolley wheel engaged by said resilient means and mounted for vertical movement and for lateral movement, with respect to a vertical plane, against the tension of said resilient means, and means carried by the head and disposed to slidably engage the trolley pole.

16. A trolley head adapted for pivotal connection with a trolley pole, a trolley wheel mounted thereon for vertical movement and for lateral movement, with respect to a vertical plane, and means carried by the head and disposed to slidably engage the trolley pole.

In testimony whereof I affix my signature in presence of two witnesses.

ALFONZO L. WILLIAMS. [L. S.]

Witnesses:
  S. G. SAMUELS,
  C. E. SCHNEIDER.

Copies of this patent may be obtained for five cents each, by addressing the "Commissioner of Patents, Washington, D. C."